(12) United States Patent
Thrower et al.

(10) Patent No.: US 8,225,407 B1
(45) Date of Patent: Jul. 17, 2012

(54) INCIDENT PRIORITIZATION AND ADAPTIVE RESPONSE RECOMMENDATIONS

(75) Inventors: Woodrow A. Thrower, Orem, UT (US); Jared S. Oates, American Fork, UT (US)

(73) Assignee: Symantec Corporation, Mountain View, CA (US)

( * ) Notice: Subject to any disclaimer, the term of this patent is extended or adjusted under 35 U.S.C. 154(b) by 2819 days.

(21) Appl. No.: 10/646,621

(22) Filed: Aug. 21, 2003

(51) Int. Cl.
G06F 19/24 (2011.01)
(52) U.S. Cl. ............................................. 726/25; 726/23
(58) Field of Classification Search ................. 726/23, 726/25
See application file for complete search history.

(56) References Cited

U.S. PATENT DOCUMENTS

| | | | |
|---|---|---|---|
| 5,893,083 A | 4/1999 | Eshghi et al. .................. 706/45 |
| 6,088,804 A | 7/2000 | Hill et al. ....................... 713/201 |
| 6,266,773 B1 | 7/2001 | Kisor et al. .................... 713/200 |
| 6,298,445 B1 | 10/2001 | Shostack et al. .............. 713/201 |
| 6,530,024 B1 * | 3/2003 | Proctor .......................... 726/23 |
| 7,039,953 B2 * | 5/2006 | Black et al. .................... 726/14 |
| 7,089,428 B2 * | 8/2006 | Farley et al. ................... 726/22 |
| 2002/0019945 A1 | 2/2002 | Houston et al. ............... 713/201 |
| 2002/0078381 A1 | 6/2002 | Farley et al. ................... 713/201 |
| 2002/0087882 A1 * | 7/2002 | Schneier et al. .............. 713/201 |
| 2002/0147803 A1 * | 10/2002 | Dodd et al. .................... 709/223 |
| 2002/0171546 A1 | 11/2002 | Evans et al. ................... 340/540 |
| 2002/0188864 A1 | 12/2002 | Jackson ......................... 713/201 |
| 2003/0097588 A1 | 5/2003 | Fischman et al. ............. 713/200 |
| 2004/0003286 A1 * | 1/2004 | Kaler et al. .................... 713/201 |
| 2004/0049698 A1 * | 3/2004 | Ott et al. ........................ 713/201 |
| 2004/0064731 A1 * | 4/2004 | Nguyen et al. ................ 713/201 |
| 2004/0128543 A1 * | 7/2004 | Blake et al. ................... 713/201 |
| 2004/0143753 A1 * | 7/2004 | Hernacki et al. .............. 713/200 |
| 2004/0255151 A1 * | 12/2004 | Mei et al. ....................... 713/201 |
| 2006/0156407 A1 * | 7/2006 | Cummins ....................... 726/25 |

* cited by examiner

Primary Examiner — Kim Vu
Assistant Examiner — Thomas Gyorfi
(74) Attorney, Agent, or Firm — Wilmer Cutler Pickering Hale and Dorr LLP

(57) ABSTRACT

Providing adaptive response recommendations for a network security incident comprising at least one underlying security event is disclosed. A first set of data associated with the event is received. An initial group of one or more recommended responsive actions to be taken in response to the event is identified based at least in part on the first set of data. A second set of data associated with the event is received. The initial group of one or more recommended responsive actions is updated based at least in part on the second set of data associated with the event.

32 Claims, 10 Drawing Sheets

INCIDENT PRIORITIZATION AND ADAPTIVE RESPONSE RECOMMENDATIONS

FIELD OF THE INVENTION

The present invention relates generally to computer networks. More specifically, a system and method for prioritizing and providing adaptive response recommendations regarding network security incidents is disclosed.

BACKGROUND OF THE INVENTION

Computer networks are ubiquitous in modern society, and particularly in the modern workplace. Many businesses and other organizations employ computer networks to enable employees and/or other users to access and store information, use computer software applications to perform a task, or communicate with each other, among other uses. Increasingly, such organizations find it necessary or useful to allow users to access at least portions of their computer network remotely. Employees, customers, clients, vendors, suppliers, and others may be allowed to access an organization's computer network for numerous purposes, such as to communicate or obtain information, place or check the status of an order, check on the availability of product, report a complaint, provide a report of a sales call, etc. Local users of computer networks likewise typically are provided access to online resources outside of their organization via the Internet. Also, many network sites are connected to network sites in other physical and/or geographic locations via a wide area network (WAN), a virtual private network (VPN), or similar services.

Many networks contain a mix of public and private information and resources. For example, a company engaged in electronic commerce might maintain web servers for serving web pages to the public, electronic commerce servers for processing online transactions, and other resources accessible by the public via the Internet. Such systems may comprise data and services, such as customer credit card information, that must be protected against unauthorized access. In the enterprise context, a computer network may house and/or provide access to some of an organization's most sensitive and valuable assets.

In general, each network resource that could be accessed by authorized or unauthorized users, either with or without physical access to the network site, must be protected to varying degrees, depending on the function performed by the resource and the nature of the data and applications that reside thereon, from compromise of the confidentiality and/or integrity of data and applications that reside on the resource and from denial of availability of the resource to those it is intended to serve. For example, while it is not necessary to protect the confidentiality of the public web page content of a web server, it may well be important to protect the integrity of such content (e.g., to protect a company's business reputation or economic opportunities) and the availability of the web server (e.g., to avoid having the web page be inaccessible for viewing).

Point systems have been developed to provide for various aspects of network security. For example, many private networks are protected by one or more firewalls. A firewall is a system interposed between a private network and a public network such as the Internet, which is configured to prevent unauthorized access via the public network to protected resources on the private network. In addition, many network-connected computer systems are protected by anti-virus software designed to protect the system from attack by computer viruses. In the enterprise context, many networks are protected by intrusion detection systems (IDS) and other systems, such as honey pot and deception servers, to protect the network against and monitor for attacks by an unauthorized (typically remote) user, such as a "hacker" or the like. Vulnerability assessment products have been provided to assess network vulnerability to such attacks and provide information about ways to protect against them (e.g., download a security "patch" for a particular piece of software).

The point protection systems described above, and similar products and systems, each may generate security information. In the event of an attack on the security of the network, two or more such point systems may generate large volumes of potentially significant data relating to the attack. To enable network security administrators to coordinate such information, security incident management software has been developed. Such software receives and processes security information received from one or more point systems and/or other sources (such as data entered at a user interface) and provides network security personnel with information and/or tools to enable them to respond appropriately. Such information may include an assigned priority for each security incident and one or more recommended responsive actions. However, the typical security incident management software provided to date focuses primarily on actions that can or should be taken subsequent to an attack to avoid its recurrence. Such information, while important, does not address the many other phases of an attack and recovery. Moreover, the typical security incident management software provides only a static set of priorities and recommendations, and does not adapt to changes in the information relevant to the attack and/or actions taken by network security personnel in response to the attack.

Therefore, there is a need for a way to manage network security incidents that takes into consideration all phases of a security incident and that adapts dynamically as information related to the security incident changes, such as when new data about the incident is received and/or when recommended actions have been completed by network security personnel.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A system and method are disclosed for providing dynamic incident prioritization and adaptive response recommendations for security incidents. Security incidents are identified from security event data and a priority assigned. A set of recommended responsive actions is identified and presented. As new information is received, the priority and/or the recommended responsive actions are updated, as appropriate, in light of the new information.

Figure 1:
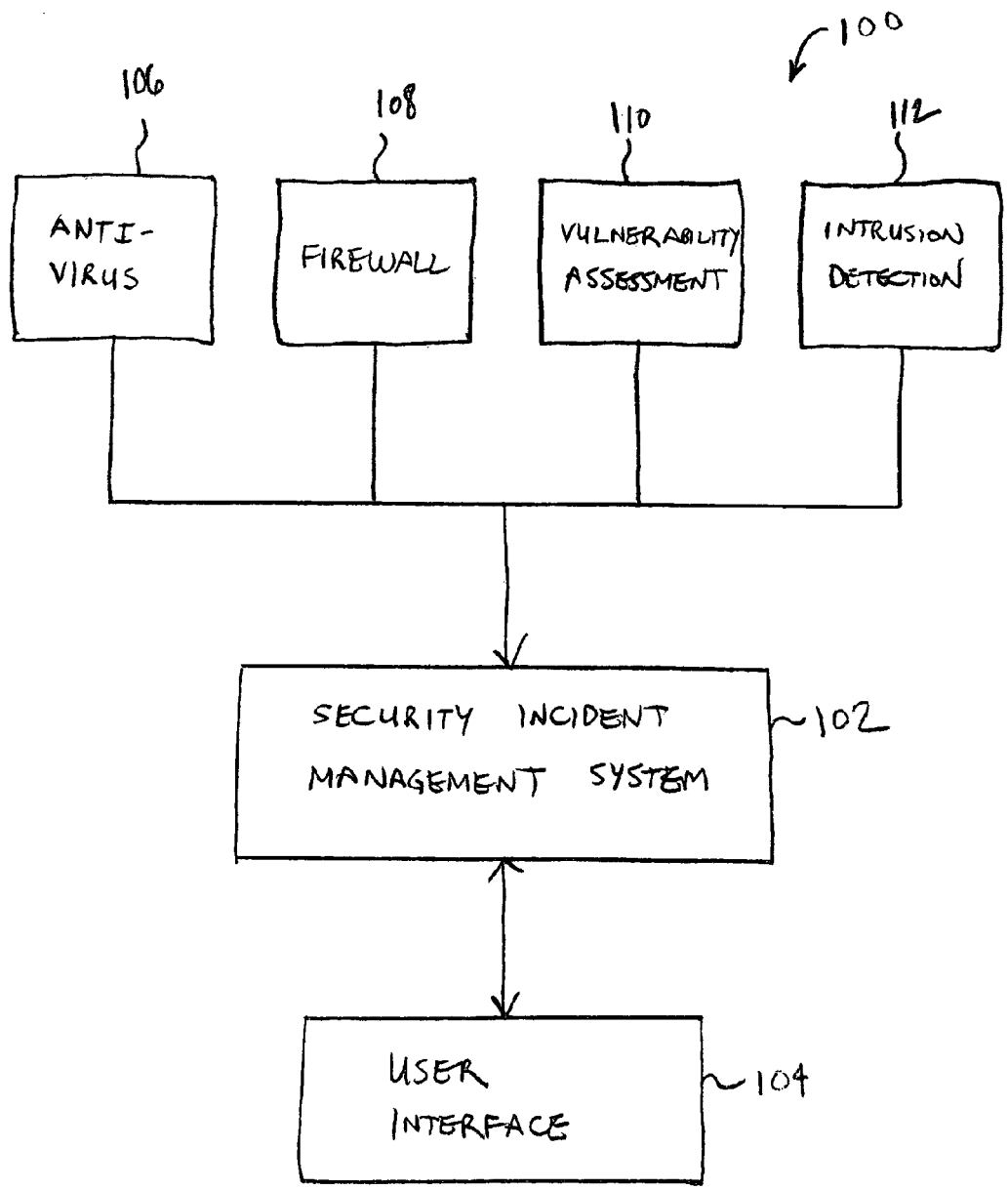
FIG. 1 is a schematic diagram of an adaptive security incident management system provided in one embodiment.

FIG. 1 is a schematic diagram of an adaptive security incident management system provided in one embodiment. FIG. 1 shows an integrated network security system 100 comprising a security incident management system 102 connected to a user interface 104. While only one user interface 104 is shown in FIG. 1, in one embodiment two or more user interface systems may be connected to the security incident management system 102. In one embodiment, the user interface system 104 may comprise a client computer system configured to communicate with the security incident management system 102 using a browser. FIG. 1 shows the security incident management system 102 connected to receive security-related information from an anti-virus application 106, a firewall 108, and vulnerability assessment system 110, and an intrusion detection system 112. While each of the systems 106-112 is represented in FIG. 1 by a single block, in one embodiment the computer network served by the security incident management system 102 may comprise two or more anti-virus applications 106, firewalls 108, vulnerability assessment systems 110, and/or intrusion detection systems 112. In addition, many other types of system may be configured to feed security-related data to the security incident management system 102, including without limitation deception systems, attack source tracking systems, policy compliance systems, etc. The elements 106-112 of FIG. 1 are shown solely by way of example of the types of systems that may be used in one embodiment to provide security-related data to the security incident management system 102.

Figure 2:
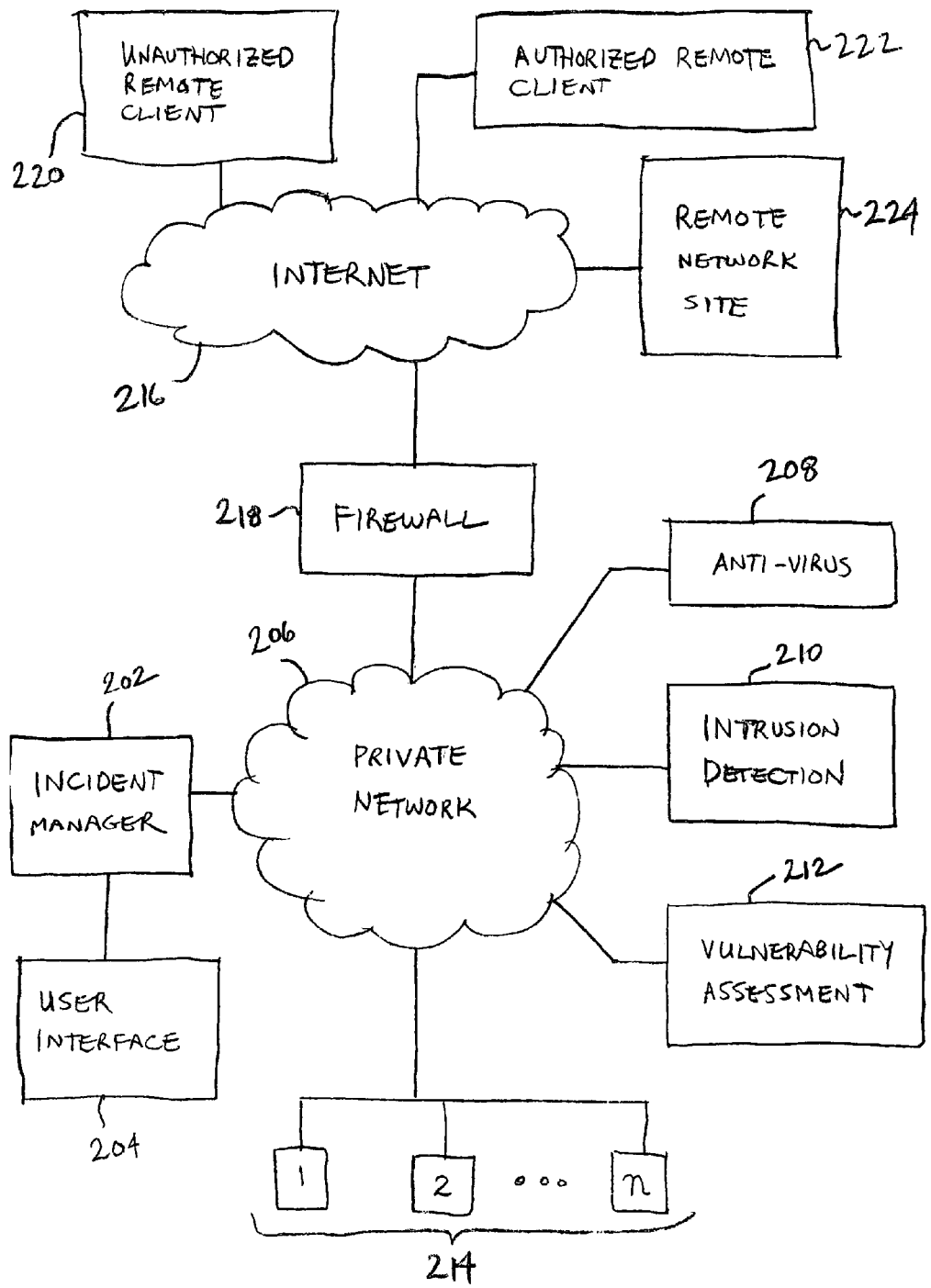
FIG. 2 illustrates a security incident management system implemented in one embodiment to protect a private network.

FIG. 2 illustrates a security incident management system implemented in one embodiment to protect a private network. The system comprises a security incident manager 202 connected to a user interface 204. The incident manager 202 is connected via a private network 206 to an anti-virus application 208, and intrusion detection system 210, and a vulnerability assessment system 212. A group of network elements 214 (numbered 1 to n in FIG. 2) are connected to one another and the incident manager via the private network 206. The network elements 214 are configured in one embodiment to connect to the public Internet 216 via a firewall 218. The firewall 218 is configured to prevent unauthorized access to the private network 206 and associated network elements by unauthorized remote users, such as unauthorized remote user 220. At the same time, the firewall 218 is configured to permit remote access to at least selected elements associated with the private network 206 by authorized remote users such as authorized remote client 222 and/or users on remote network site 224, which in one embodiment may form part of the same WAN as the private network 206.

In one embodiment, the incident manager 202 may be configured to receive security-related data from many sources, including without limitation user input via the user interface 204; data provided via the private network 206 by software agents associated with the anti-virus application 208, intrusion detection system 210, and/or vulnerability assessment system 212; data provided by firewall 218; data received via the Internet from network security components installed at the remote network site 224; data provided by security software (e.g., anti-virus, firewall) installed on the authorized remote client 222; and reports of attacks from external sources such as security tracking and reporting services and intrusion detection and track-back software installed on other networks.

As used herein, each set of security-related data received by the incident manager as a discrete unit of data (such as a notification or report) from a single source is referred to as a "security event". Stated another way, a "security event" as used herein is a set of security-related data from a single source that must be evaluated to determine if responsive action is necessary. The term "security incident" will be used herein to refer to a set of one or more related security events regarding which it has been determined that network security personnel and/or systems must take responsive action to protect the network.

Figure 3:
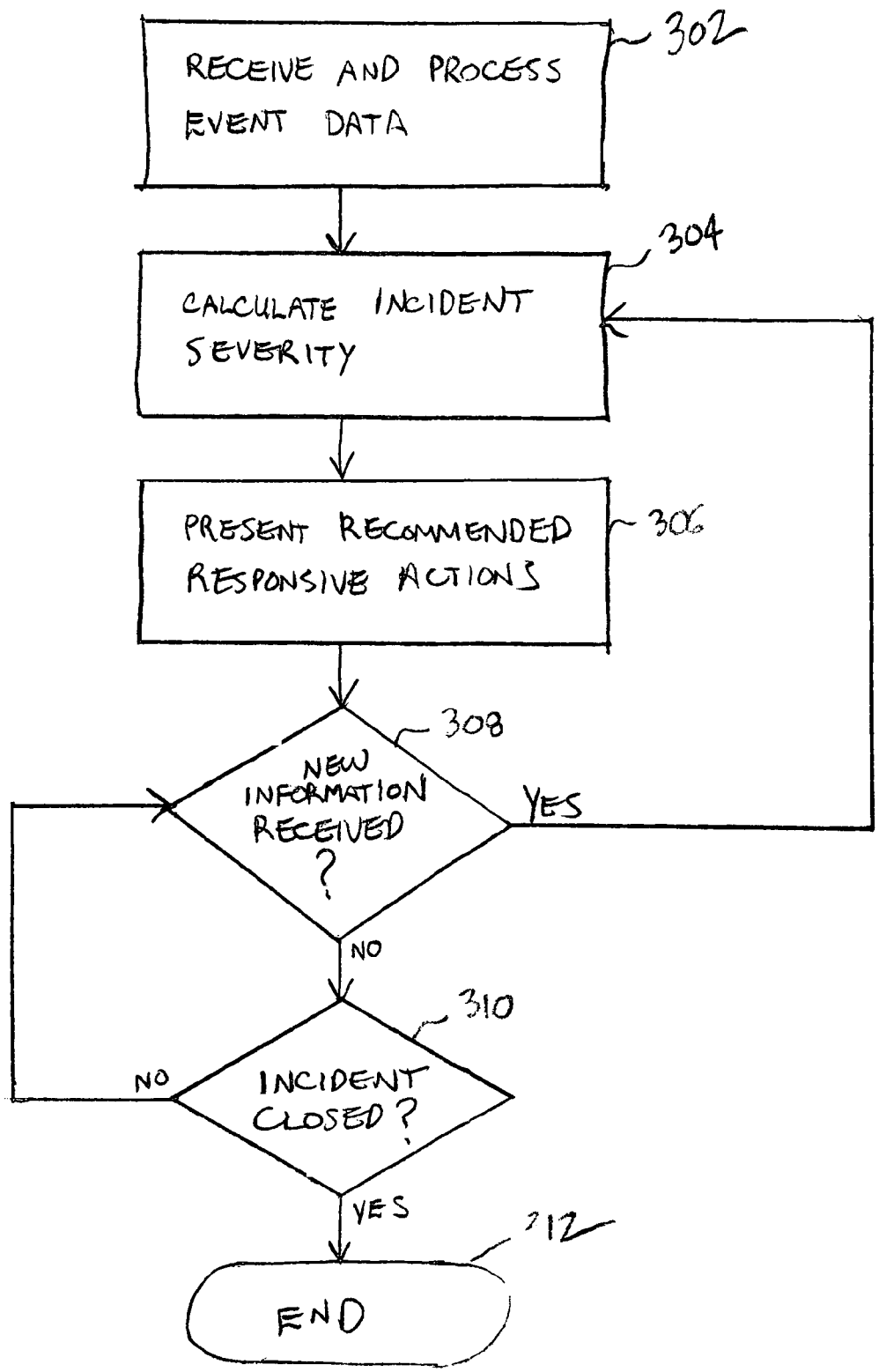
FIG. 3 is a flowchart illustrating a process used in one embodiment to provide dynamic incident prioritization and adaptive response recommendations for network security incidents.

FIG. 3 is a flowchart illustrating a process used in one embodiment to provide dynamic incident prioritization and adaptive response recommendations for network security incidents. The process begins in step 302, in which security event data is received and processed. In one embodiment, step 302 is repeated each time data relating to a security "event" is received. In one embodiment, the data received in step 302 comprises one or more attributes of the event. In one embodiment, the attribute(s) included in the event data are identified based on their value or potential value in assessing the severity of the event and/or generating a set of recommended responses, as described more fully below.

In one embodiment, as described more fully below in connection with FIG. 4, step 302 comprises determining which security "events" should be considered and processed as a security "incident". In step 304, for those security "events"

that are determined to comprise a security "incident", the "severity" of the incident is calculated. In one embodiment, the "severity" comprises a number the magnitude of which is proportional to the threat posed to the security of the protected network and its associated data and resources, relative to other active security incidents. Stated another way, in one embodiment an incident with a severity of X>Y might be deemed to pose a greater immediate threat to the protected network than an incident with a severity of Y. In other embodiments, the severity might be a grade assigned to an incident that rates the threat posed by that incident based on objective criteria, such as by rating the threat posed by the incident on a scale from 1 to 10, or by categorizing it based on verbal grades such as "low", "medium", and "high". In one embodiment, in the case of an incident that affects more than one network asset, step 304 comprises a two-step process in which the severity is first calculated on a per-asset basis, and a composite severity is calculated based on the respective severity values determined for each affected asset.

In step 306, recommended actions to be taken in response to the security incident are determined and presented. In one embodiment, as described more fully below in connection with FIG. 10, the recommended responsive actions may be selected based on such factors as the nature of the attack (e.g., data associated with one or more events underlying the incident), the vulnerabilities exploited by the attack, and the characteristics of the affected system(s). In step 308, it is determined whether any new information that might affect the severity of the incident or the recommended responsive actions has been received. Such new information may comprise an update to the data associated with the event(s) underlying the incident, changes in the configuration or status of the affected system(s), information regarding the incident that is gathered and provided by network security personnel, and/or receipt of an indication that a recommended responsive action has been taken (and, if applicable, an indication of the result of the action).

If new information has been received, the process returns to step 304 in which the severity of the incident is re-calculated to take into account the new information. The process then proceeds to step 306 in which a new set of recommended responsive actions is determined and presented. If it is determined in step 308 that no new information has been received, the process proceeds to step 310 in which it is determined whether the incident has been closed. If the incident has been closed, the process ends in step 312. If the process has not been closed, the process returns to step 308, and the steps 308 and 310 are repeated until either new information is received or the incident is closed.

Figure 4:
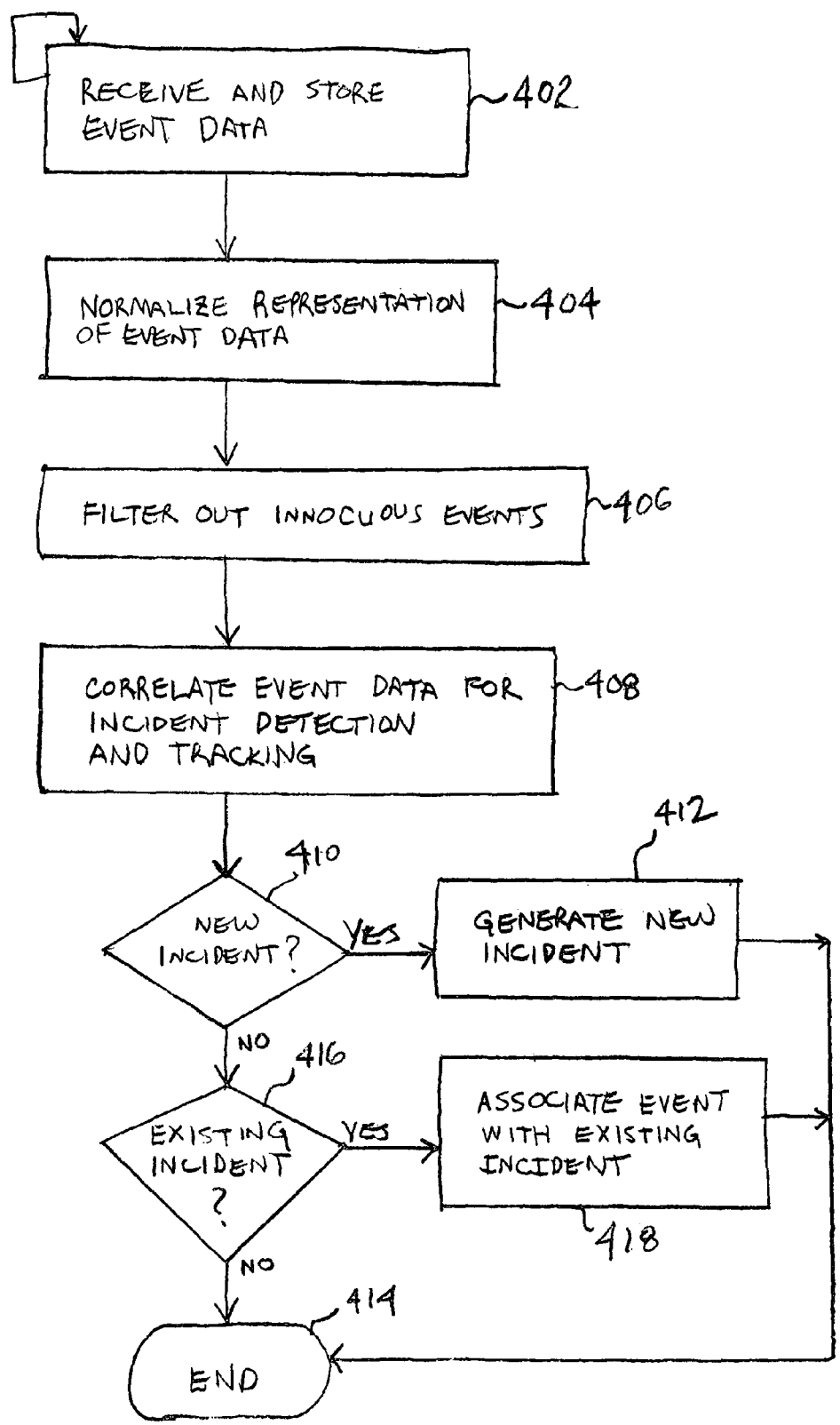
FIG. 4 is a flow chart illustrating a process used in one embodiment to receive and process event data, as in step 302 of FIG. 3.

FIG. 4 is a flow chart illustrating a process used in one embodiment to receive and process event data, as in step 302 of FIG. 3. The process begins in step 402, in which event data is received and stored. In one embodiment, step 402 is repeated as event data is received, and the remaining steps of the process shown in FIG. 4 are completed for each event received. In step 404, the representation of the event data is normalized. In one embodiment, the normalization completed in step 404 places event data received from multiple and/or disparate sources into a common format. In one embodiment, step 404 comprises mapping data fields from known or supported point security systems and/or other sources to corresponding data fields of the common format. In one embodiment, step 404 comprises mapping data values from known or supported point security systems and/or other sources to appropriate corresponding values under the common format. For example, a first anti-virus product from a vendor A may present a first set of data related to a detected anti-virus event in a first format while a comprehensive security product from a vendor B that includes an anti-virus component might provide a second set of data in a second format for the same type of event (or even for the very same event). In one embodiment, in the above example step 404 would comprise transforming the first set of data in the first format and the second set of data in the second format into a common set of data in a common format. In one embodiment, step 404 comprises using knowledge about the products and/or services that may generate event data, and in particular the format and contents of such data as generated by such products and services, to transform product-specific (or service-specific) data into the common format.

In step 406, events that are known to be innocuous are filtered out and no further processing is done with respect to such filtered out events. In one embodiment, events are filtered in step 406 through application of a set of pre-defined and/or user defined rules that consider event data and/or context information. For example, in one embodiment, Internet Control Message Protocol (ICMP) traffic that originates from a host identified by the user as a network management station might be identified in step 406 as being innocuous, even though one or more point systems might be configured to generate a security "event" in response to detecting a message sent using that protocol.

In step 408, event data is correlated for purposes of detecting and tracking security incidents. In step 410, it is determined whether the event being processed comprises a new security incident. In one embodiment, step 410 comprises calculating a "worst case" severity, as described more fully below in connection with FIG. 5. In one embodiment, step 410 comprises correlating event data with other events, context information, and/or other data internal to the event itself to determine if a security incident is taking place, as described more fully below in connection with FIG. 5. If it is determined in step 410 that the event comprises a new security incident, then a new incident is generated in step 412 and the event data is associated with the newly-generated security incident, and the process shown in FIG. 4 ends in step 414. If it is determined in step 410 that the event does not comprise a new incident, the process proceeds to step 416, in which it is determined whether the event data is associated with an existing security incident. If it is determined in step 416 that the event data relates to an existing incident, the event data is associated with the corresponding existing incident in step 418 and the process shown in FIG. 4 ends in step 414. If it is determined in step 416 that the event data is not associated with an existing incident, the event data is stored for possible future reference or use and the process shown in FIG. 4 ends in step 414.

Figure 5:
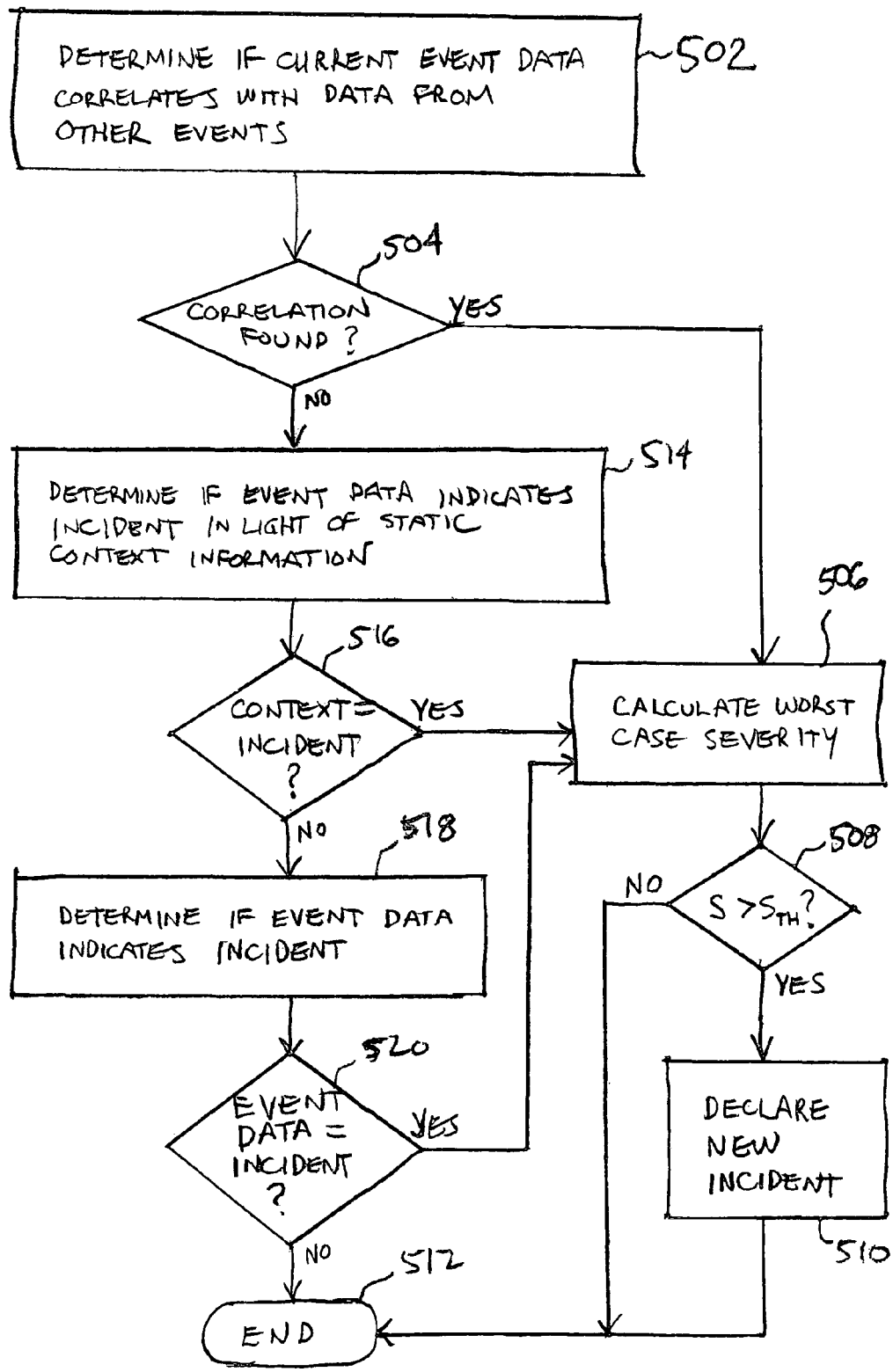
FIG. 5 is a flow chart illustrating a process used in one embodiment to correlate event data to determine if a security event should be processed as a new security incident, as in steps 408 and 410 of the process shown in FIG. 4.

FIG. 5 is a flow chart illustrating a process used in one embodiment to correlate event data to determine if a security event should be processed as a new security incident, as in steps 408 and 410 of the process shown in FIG. 4. The process begins in step 502, in which event data is correlated with data from other events to determine if the events together comprise a security incident. In one embodiment, step 502 comprises considering data from events generated in approximately the same timeframe as the event being processed. In one embodiment, step 502 comprises considering data from events associated with the same source Internet Protocol (IP) address, source port, destination IP address, and/or destination port as those associated with the event being processed. In step 504, it is determined whether a correlation with data from other events has been found. If it is determined in step 504 that such a correlation has been found, the process proceeds to step 506, in which a "worst case" severity is calculated. In one embodiment, the "worst case" severity calculation of step 506 assumes that the security incident represents a successful exploitation of the associated vulnerabilities, with the worst possible impact on the affected system(s). The question asked in step 506 is: what is the worst that could happen if the security incident is in fact taking (or has in fact taken) place and was fully successful? Once the "worst case" severity has been calculated in step 506, the process proceeds to step 508, in which it is determined if the "worst case" severity is greater than a prescribed severity threshold. If it is determined that the "worst case" severity exceeds the threshold, a new incident is declared in step 510 and the process ends in step 512. If it is determined that the "worst case" severity does not exceed the threshold, the process ends in step 512.

If it is determined in step 504 that no correlation to other event data was found, the process proceeds to step 514, in which event data is considered in light of context information for purposes of determining whether the event data indicates a security incident. In step 516, it is determined whether a correlation between the event data and context information indicates a security incident. If such a correlation was found, the process proceeds to step 506 and continues as described above. If no such correlation was found, the process proceeds to step 518, in which the event data is correlated to determine if the event data considered with other data from the same event indicates a security incident. If it is determined in step 520 that such a correlation was found, the process advances to step 506, in which a "worst case" severity is calculated, and the process continues as described above. If it is determined in step 520 that no correlation was found, the process ends in step 512.

Figure 6:
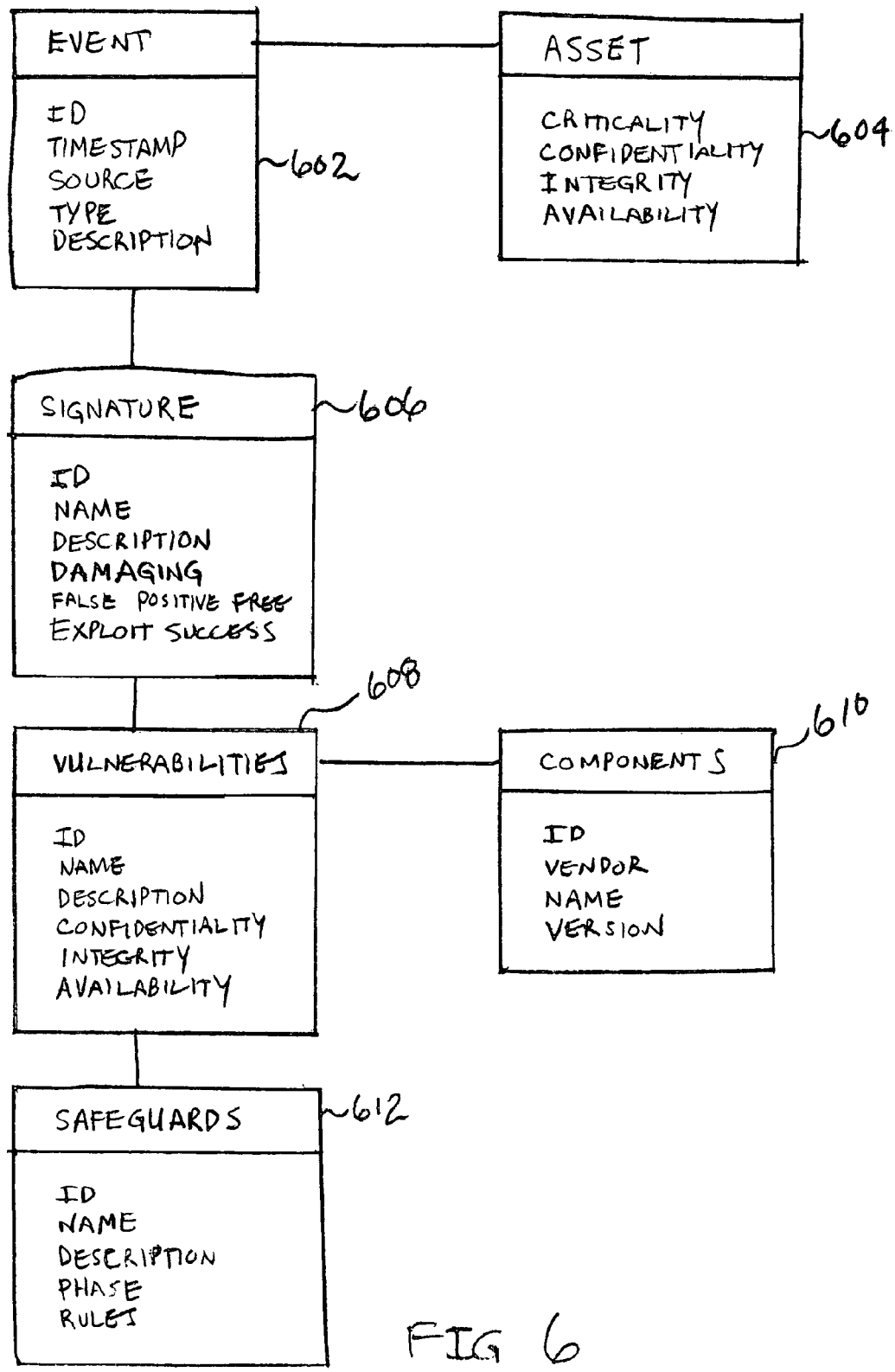
FIG. 6 illustrates in part a set of data structures used in one embodiment to provide dynamic incident prioritization and adaptive response recommendations for network security incidents.

FIG. 6 illustrates in part a set of data structures used in one embodiment to provide dynamic incident prioritization and adaptive response recommendations for network security incidents. The set comprises an "event" structure 602. In one embodiment, an entity such as event structure 602 is generated for each event. As shown in FIG. 6, in one embodiment the event structure 602 comprises an identification (ID) attribute for uniquely identifying the event, a timestamp attribute for recording the time associated with the event data, a source attribute to store an identification of where the event data came from, a type attribute to indicate the type of event with which the event data is associated, and a description attribute to store other data associated with the event. The event structure 602 and other structures shown in FIG. 6 list illustrative attributes by way of example, and those of skill in the art will recognized that other and/or different sets of attributes may be included depending on design choices and the requirements of a particular implementation. Each event such as event 602 is associated with a network asset, such as represented by asset data structure 604. In one embodiment, a network asset may comprise without limitation a system, such as a server or other computer system, a related group of computer systems, an application, a store of information, a set of data, a service or set of services, intangible assets such as human productivity or organizational credibility, and/or any other tangible or intangible thing of value associated with the network that might be compromised by a security event affecting the network. In one embodiment, as shown in FIG. 6, the asset structure 604 comprises a criticality attribute used to indicate whether (or the degree to which) the asset is "critical" in the sense of being of particular importance or value to the stakeholders of the protected network (e.g., the users or others who depend on tasks and/or services performed by the network). For example, an asset critical to the business operations of a company, such as one that would result in significant lost business, would be considered "critical". In one embodiment, the criticality is a binary variable (i.e., a system is either critical or it is not). In one alternative embodiment, a grade or number is assigned to each asset to indicate the degree to which it is critical. The asset structure 604 further comprises confidentiality, integrity, and availability attributes used to store information concerning the importance of each of these elements of computer security in relation to the associated asset. In one embodiment, the confidentiality, integrity, and availability attributes are used to store a numerical value between 1 and 5, for example, with 1 indicating a low rating with respect to the corresponding aspect of computer security and a 5 indicating a high rating. For example, for public content on a web server, the confidentiality rating might be 1 but the integrity and availability ratings might be higher, depending on the loss that might result in the availability of the asset and/or the integrity of the content were compromised. In the case of other assets, such as a payroll system, confidentiality and integrity might be more important than the availability of the asset at any given time.

Each event such as event 602 of FIG. 6 is mapped to a signature, such as represented by the signature data structure 606 of FIG. 6. In one embodiment, a signature comprises a sort of template used to classify a security event to aid in analysis of the event and the determination of the vulnerabilities the event may target and other characteristics of the event. In one embodiment, the signature structure 606 comprises an identification (ID) attribute, a name attribute to store a name used to refer to the signature, and a description attribute used to store a description of the signature. The signature structure 606 further comprises an attribute labeled "damaging" in FIG. 6, which is used to store an indication of the extent to which an exploit of the type represented by the signature is damaging to an affected asset. In one embodiment, a value corresponding to assessments of "always", "usually", or only "sometimes" damaging, as appropriate, is stored as the value for the "damaging" attribute. The signature structure 606 further comprises a "false positive free" attribute, used in one embodiment to store an indication of the degree of confidence that the signature detected in a particular instance a condition other than the one it was designed to detect. In one embodiment, the "false positive free" attribute has a first value if the signature has never detected a condition other than the one it was designed to detect and a different value if it has generated a false positive on at least one occasion. Finally, the signature structure 606 comprises an "exploit success" attribute to store an indication of whether the associated security exploit has been completed successfully. In one embodiment, an attempt to exploit a particular vulnerability might comprise a security event that would match a signature for the attempt, in which case the signature attribute "exploit success" would have a "yes" value. The same attempt, however, might have a "no" value for "exploit success" if the signature were one associated with the exploit itself, rather than an attempt at it. In one embodiment, the "exploit success" attribute is always set to "yes" for purposes of calculating a "worst case" severity, as described above in connection with step 506 of FIG. 5, regardless of whether or not it is known whether the exploit was successful.

Each signature such as signature structure 606 is mapped to one or more associated vulnerabilities, such as represented by vulnerability structure 608 of FIG. 6. Each vulnerability comprises a known actual or potential security weakness that an attack may attempt to exploit. The vulnerability structure 608 comprises for each vulnerability an identification (ID) attribute, a name attribute, and a description attribute. In addition, the vulnerability structure 608 comprises attributes used to store a measure of the potential impact of a successful exploitation of the vulnerability on the confidentiality, integrity, and availability, respectively, of an affected asset. In one embodiment, when calculating a "worst case" severity these attributes are set to the highest possible value for the particular vulnerability(ies) associated with an event. In one embodiment, these values are set to "unknown" or to a "best guess" value when calculating severity once an incident has been declared, with the values being updated by actual values once the true impact on the affected asset has been assessed.

Each vulnerability maps to a corresponding component to which it pertains. A component may comprise, for example, a particular piece of hardware or software that exhibits the vulnerability. In one embodiment, each associated component has associated with it a component data structures such as component structure 610 of FIG. 6. The component structure 610 comprises an identification (ID) attribute, a vendor attribute to store the name of the vendor of the component, a name attribute to store the name of the component, such as a product name, and a version attribute to store an identification of the version(s) of the component to which the vulnerability pertains.

In one embodiment, each vulnerability also maps to one or more safeguards, each of which is represented by a safeguard data structure such as safeguard structure 612 of FIG. 6. Each safeguard comprises one or more responsive actions that it may be appropriate to take in response to an attack that exploits the vulnerability with which the safeguard is associated. The safeguard structure 612 comprises an identification (ID) attribute, a name attribute, and a description attribute. In addition, each safeguard comprises a "phase" attribute. In one embodiment, the phase attribute is used to store an indication of the phase in the security incident response cycle to which a safeguard applies. In one embodiment, the phases into which safeguards are organized are based on the six phases of the SANS incident response model: Identify, Contain, Eradicate, Recover, Follow Up, and Prepare. Finally, the safeguards structure 612 comprises a rules attribute. In one embodiment, the rules attribute stores a set of one or more rules that must be satisfied in order for a safeguard to be provided as a recommended action in response to a particular security incident. In one embodiment, the rules might evaluate incident attributes associated with or derived from the attributes of the affected asset, the event(s) comprising the incident, and/or the vulnerability(ies) being exploited in determining whether the safeguard should be provided as a recommended action.

Figure 7:
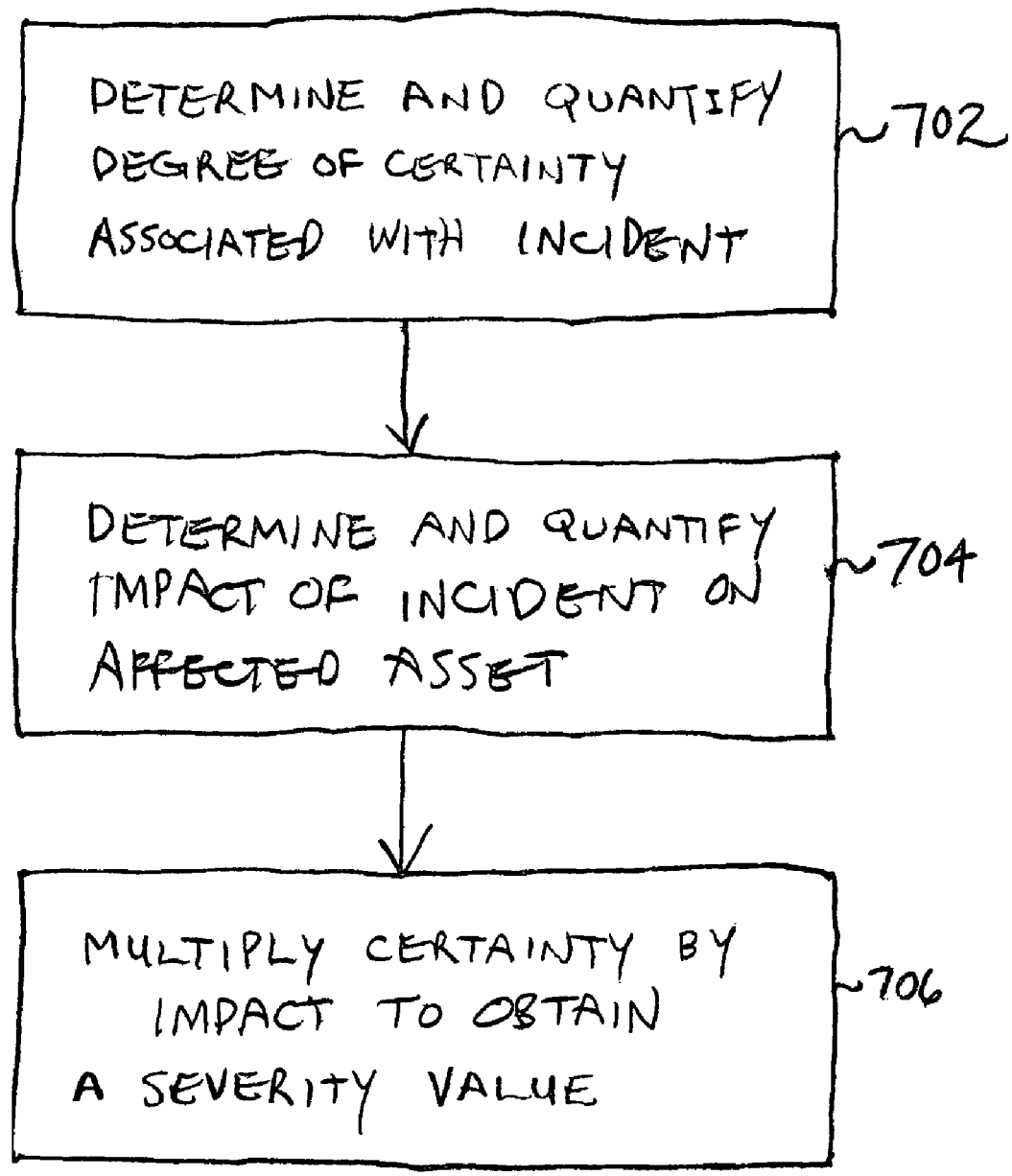
FIG. 7 is a flow chart illustrating a process used in one embodiment to calculate severity for an event and/or incident.

FIG. 7 is a flow chart illustrating a process used in one embodiment to calculate severity for an event and/or incident. In one embodiment, the process of FIG. 7 is used to calculate a "worst case" severity for use in determining whether an event should be determined to constitute a security incident, as in step 506 of the process shown in FIG. 5. In one embodiment, the process of FIG. 7 is used to calculate a severity value for a security incident, as in step 304 of the process shown in FIG. 3. The process of FIG. 7 begins in step 702, in which the degree of certainty associated with the security event/incident is determined and quantified. In step 704, the impact of the event/incident on the affected asset is determined and quantified. In step 706, a severity value is calculated by multiplying the certainty by the asset impact.

Figure 8:
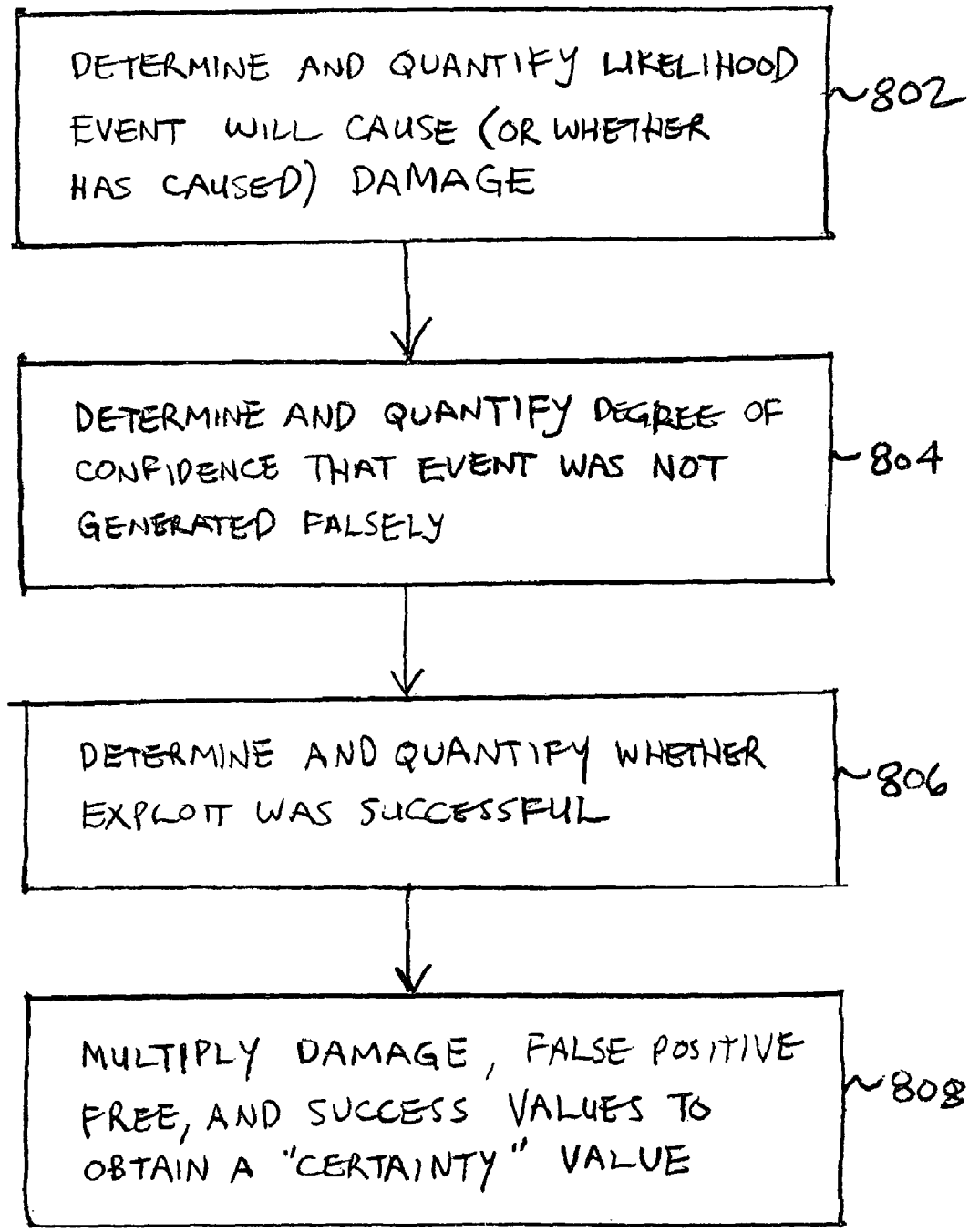
FIG. 8 illustrates a process used in one embodiment to determine and quantify the degree of certainty associated with a security event/incident, as in step 702 of FIG. 7.

FIG. 8 illustrates a process used in one embodiment to determine and quantify the degree of certainty associated with a security event/incident, as in step 702 of FIG. 7. The process begins in step 802, in which the likelihood that the event/incident will cause (or has caused) damage is determined and quantified. In one embodiment, step 802 comprises determining whether an event/incident of the type being processed "always", "usually", or only "sometimes" causes damage, and assigning a corresponding numerical value to the assessment. In step 804, the degree of confidence that the event/incident was not generated falsely is determined and quantified. In one embodiment, step 804 comprises determining the value of an attribute of the signature associated with the event/incident that has one value if the signature is considered to be "false positive free" and a second value if on at least one occasion (or some other prescribed number of occasions) the signature has generated a positive indication under conditions other than those it was designed to detect. In step 806, it is determined whether the exploit was successful, and a corresponding numerical value is assigned. As noted above, in one embodiment the "success" variable is set at a value indicating success for purposes of determining a "worst case" severity, as in step 506 of FIG. 5, and is set initially at "unknown" to calculate the severity of an active incident. In step 808, the results of steps 802, 804, and 806 are multiplied together to obtain a "certainty" value. In one embodiment, one or more of steps 802, 804, and 806 may comprise assessing information relating to known threats and attack activity on a global, regional, industry-specific, and/or organization-specific scale.

Figure 9:
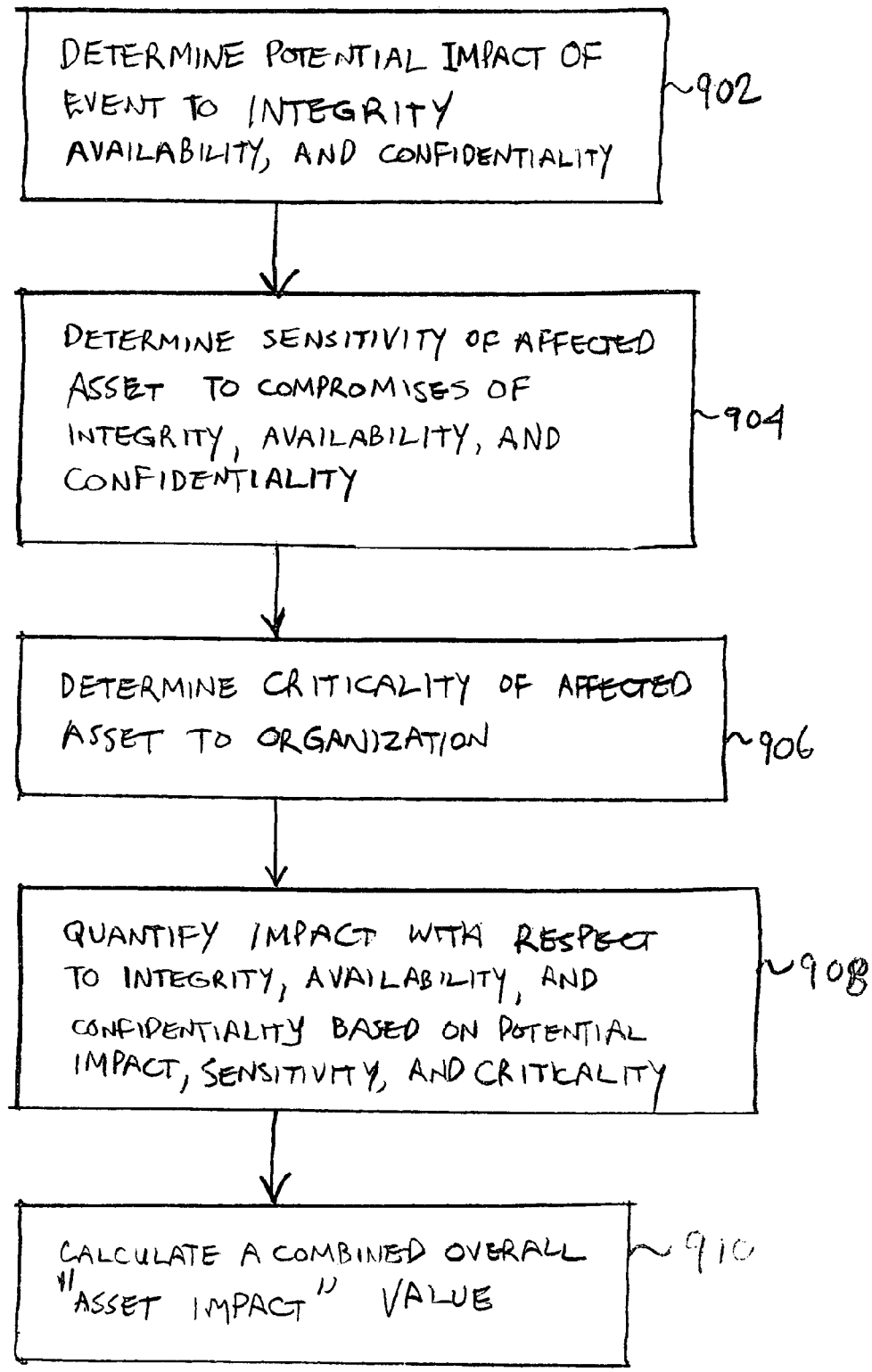
FIG. 9 is a flow chart illustrating a process used in one embodiment to determine and quantify the asset impact of an event/incident, as in step 704 of FIG. 7.

FIG. 9 is a flow chart illustrating a process used in one embodiment to determine and quantify the asset impact of an event/incident, as in step 704 of FIG. 7. The process begins in step 902, in which the potential impact of the event to the integrity, availability, and confidentiality of the affected asset, respectively. In one embodiment, step 902 comprises determining the value of one or more attributes of a vulnerability to which a signature associated with the event has been mapped, such as the integrity, availability, and confidentiality attributes of the vulnerability structure 608 of FIG. 6.

In step 904, the sensitivity of the affected asset to compromises of integrity, availability, and confidentiality, respectively, is determined. In one embodiment, step 904 comprises evaluating one or more attributes of the affected asset, and in particular the nature of the function performed by the affected asset and the value provided by that asset. In one embodiment, step 904 comprises determining the value of one or more attributes of the affected asset, such as the integrity, availability, and confidentiality attributes, respectively, of the asset structure 604 of FIG. 6.

In step 906, the criticality of the affected asset is determined. In one embodiment, the criticality is determined based on the importance of the affected asset to the organization, as indicated by such factors as the economic and/or other loss such stakeholders might suffer as a result of the asset being compromised. In one embodiment, step 906 comprises determining the value of one or more attributes of the affected asset, such as the criticality attribute of the asset structure 604 of FIG. 6.

In step 908, the impact of the event with respect to each of (1) integrity, (2) availability, and (3) confidentiality of the affected asset is quantified based on the potential impact determined with respect to each in step 902, the sensitivity to compromises of each determined in step 904, and the criticality of the asset as determined in step 906. In one embodiment, the corresponding values for potential impact, sensitivity, and criticality determined in steps 902-906 are multiplied together in step 908 to determine an asset impact value for each dimension of possible compromise (i.e., the integrity, availability, and confidentiality of the asset). In step 910, a combined overall asset impact value is determined based on the separate values for integrity, availability, and confidentiality, respectively, determined in step 908. In one embodiment, the three separate asset impact values are combined to generate an overall asset impact value by application of the following equation:

$$\text{Asset\_impact} = \frac{\sqrt{\text{Integrity\_impact}^2 + \text{Availability\_impact}^2 + \text{Confidentiality\_impact}^2}}{\sqrt{3}}$$

where the Asset_impact is the combined, overall impact and the Integrity_impact, Availability_impact, and Confidentiality_impact are the impact values determined with respect to integrity, availability, and confidentiality, respectively, in step 908.

Figure 10:
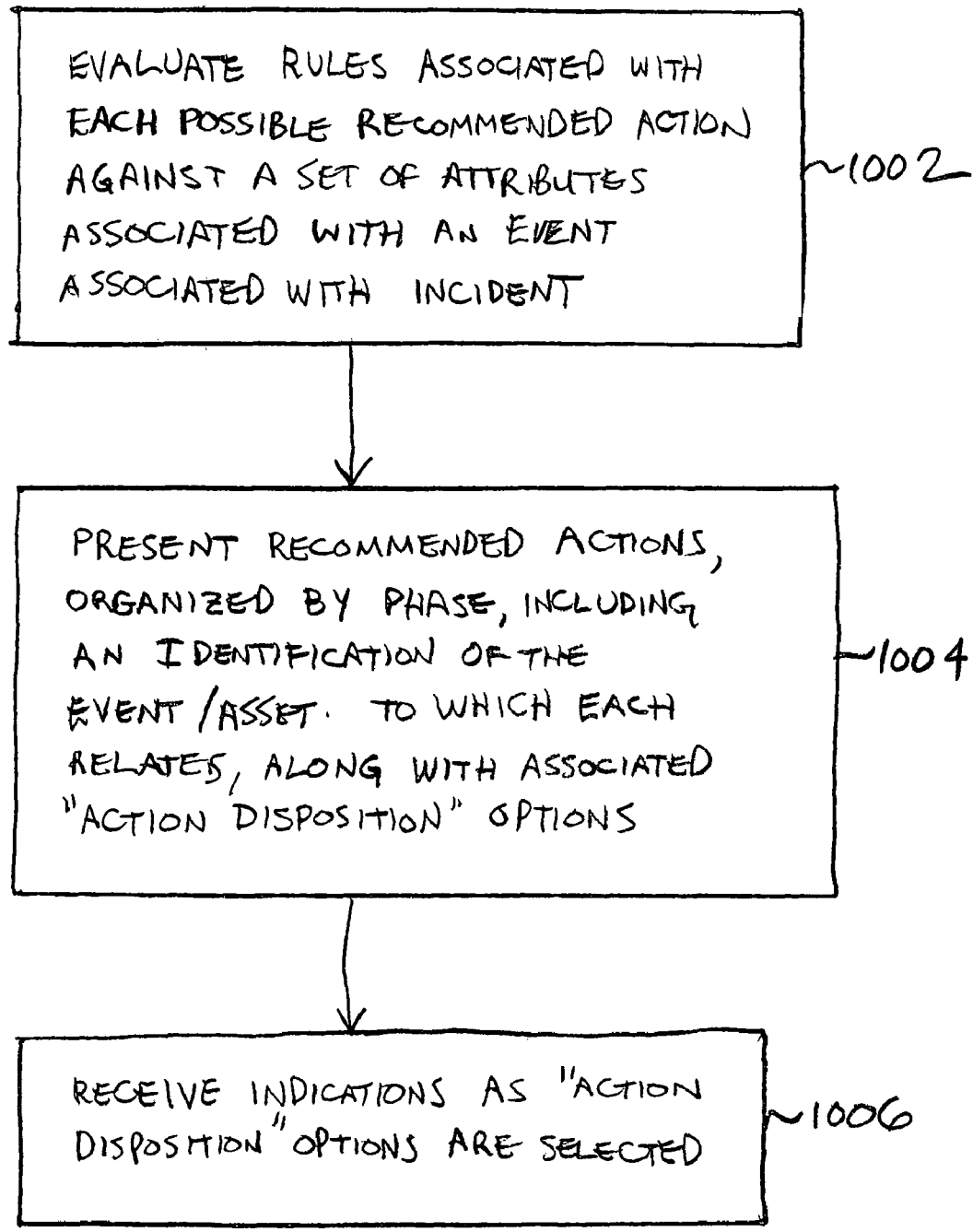
FIG. 10 is a flow chart illustrating a process used in one embodiment to present recommended actions to be taken in response to a security incident, as in step 306 of FIG. 3.

FIG. 10 is a flow chart illustrating a process used in one embodiment to present recommended actions to be taken in response to a security incident, as in step 306 of FIG. 3. The process begins in step 1002, in which rules associated with each possible recommended action that may be applicable to the security incident are evaluated to determine which of the possible recommended actions should be presented. In one embodiment, each possible recommended action has an associated data structure, such as the safeguard structure 612 of FIG. 6, which has one or more attributes setting forth a rule or rules for when that recommended action should be presented. In one embodiment, the rule(s) may comprise a rule the result of which depends on one or more attributes of the affected asset. In one embodiment, the rule(s) may comprise a rule the result of which depends on one or more attributes of a vulnerability associated with the incident. the rule(s) may comprise a rule the result of which depends on one or more attributes of a signature associated with the incident. The rule(s) may comprise a rule the result of which depends on one or more attributes of an event underlying the incident.

In step 1004, the recommended actions identified in step 1002 (i.e., those of the possible recommended actions whose rule set is satisfied) are presented. In one embodiment, the rules are presented using a format in which they are organized by security incident response phase (such as the SANS incident response model phases described above). In one embodiment, the recommended actions are presented with an identification of the event(s) and/or asset(s) to which they relate. In one embodiment, recommendations that apply to more than one event within a single incident are consolidated so that the recommendation is only presented once, while preserving context information associated with each related event. In one embodiment, recommendations may be grouped by context information, such as by affected asset or asset group. In one embodiment, recommended actions are presented with "action disposition" options to be used by network security personnel to report that a recommended action has been completed and/or to indicate the result or response obtained by completing the recommended action, as applicable. For example, a recommended action might be "determine if the asset was vulnerable to the exploit". For such an action, the action disposition options might include the options "yes", "no", and/or "unknown". In one embodiment, an action disposition may constitute new information that would cause the incident severity and/or the set of recommended actions to change, as in step 308 of FIG. 3, thereby causing the severity and/or set of recommended actions to be updated and the new severity and/or set of recommended actions to be presented.

In one embodiment, one or more security systems, such as the security incident management system 102 of FIG. 1, may be configured to complete certain recommendation actions automatically, without human intervention, once such recommended actions have been identified as appropriate (as in step 1002 of FIG. 10). In one embodiment, such a system may be configured to complete such an action only after receiving an indication from a user, such as network security personnel, that it is okay to complete the action. In one embodiment, a system configured to complete a recommended action automatically may also be configured to generate an "action disposition" indicating that the action has been completed. In one embodiment, such a system-generated action disposition may, like a user-generated disposition, constitute new information that could result in the severity and/or set of recommended actions being updated. For example, a recommended action might be that a determination be made as to whether the affected asset is vulnerable to the exploit. In one embodiment, a security incident manager may be configured to query a vulnerability assessment system, if installed, automatically to determine whether the affected asset is vulnerable. If it is determined that the asset is not vulnerable, the severity of the incident might be lowered and the list of remaining recommended actions adjusted accordingly.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for managing a network security incident comprising at least one underlying security event, the method comprising:
receiving a first set of data associated with the event;
identifying based at least in part on said first set of data an initial group including a first set of one or more recommended responsive actions to be taken in response to the event;
receiving a second set of data associated with the event; and
updating, via one or more computer processors, said initial group of one or more recommended responsive actions to include a second set of one or more recommended responsive actions based at least in part on said second set of data associated with the event.

2. The method of claim 1, wherein the second set of data comprises an indication that at least one recommended responsive action of said initial group of one or more recommended responsive actions has been completed.

3. The method of claim 1, wherein the second set of data comprises an indication of the result of taking at least one recommended responsive action of said initial group of one or more recommended responsive actions.

4. The method of claim 1, wherein said second set of data comprises a data element provided as input by a user at a user interface.

5. The method of claim 1, further comprising presenting said initial group of one or more responsive actions to a user via an interface.

6. The method of claim 5, wherein:
the security event is associated with an affected network asset;
the security event comprises one of a plurality of related security events;

one or more of said recommended responsive actions may be associated both with the security event and with at least one other of said plurality of related security events; and said one or more of said recommended responsive actions is/are presented to the user only once.

7. The method of claim 6, wherein context information associated with the security events associated with said one or more of said recommended responsive actions is presented to the user.

8. The method of claim 7, wherein recommended responsive actions may be grouped for presentation to the user based on context information.

9. The method of claim 8, wherein the context information based on which the recommended actions may be group for presentation to the user comprises an affected asset or asset group.

10. The method of claim 1, further comprising calculating an initial severity value for the event based at least in part on said first set of data.

11. The method of claim 10, wherein said event is associated with an attribute of the event and said initial group of one or more recommended responsive actions and said initial severity value are based at least in part on said attribute.

12. The method of claim 10, further comprising calculating an updated severity value for the event based at least in part on said second set of data.

13. The method of claim 10, wherein said severity value indicate the degree of risk of harm posed by the event.

14. The method of claim 10, wherein said security incident is associated with a plurality of underlying security events and the method further comprises calculating based at least in part on the first set of data an initial severity value for the incident and calculating based at least in part on the second set of data an updated severity value for the incident.

15. The method of claim 14, wherein said steps of calculating an initial severity value for the incident and calculating an updated severity value for the incident comprise:
calculating a severity value for each underlying security event; and
calculating a composite severity value for the incident based on the respective severity values calculated for each underlying security event.

16. The method of claim 10, further comprising:
determining based at least in part on said first set of data whether the event should be processed as a security incident requiring responsive action.

17. The method of claim 16, wherein said step of determining comprises comparing said initial severity value with a threshold severity value and wherein it is determined that the event should be processed as a security incident if the initial severity value is greater than the threshold severity value.

18. The method of claim 16, wherein said step of determining comprises correlating said first set of data with at least one of the group comprising context information, other event data, and data comprising part of the first set of data.

19. The method of claim 18, wherein context information may comprise one or more of the group comprising target system information, source system information, event-specific details, and the relationship the target system's information and services have with the assets, liabilities, and objectives of an organization affected by the event.

20. The method of claim 10, wherein the event is associated with an affected asset associated with the network and wherein the step of calculating an initial severity value comprises:
determining a degree of certainty associated with the event; and
determining the likely or, if known, known impact of the event on the affected asset.

21. The method of claim 20, wherein determining a degree of certainty comprises:
determining if the event has caused damage to the affected asset, if known;
in the event it is not known whether the event has caused damage to the affected asset, classifying the event by event type and determining based at least in part on the event type the extent to which the event is likely to have resulted in damage to the affected asset;
determining the degree of confidence that the event was not generated falsely; and
determining whether the event comprises a successful attack on the affected asset.

22. The method of claim 20, wherein determining a degree of certainty comprises assessing information associated with known threats.

23. The method of claim 20, wherein determining a degree of certainty comprises assessing information associated with attack activity on a global, regional, industry-specific, and/or organization-specific scale.

24. The method of claim 20, wherein determining the likely or, if known, known impact of the event on the affected asset, comprises:
determining the potential impact of the event on the affected asset;
determining the sensitivity of the affected asset to the potential impact; and
determining the criticality of the affected asset to an organization associated with the network.

25. The method of claim 24, wherein determining the potential impact of the event on the affected asset comprises determining separately the potential impact of the event on the integrity, availability, and confidentiality of the affected asset.

26. The method of claim 24, wherein the potential impact comprises an attribute of a vulnerability associated with the event.

27. The method of claim 24, wherein determining the sensitivity of the affected asset to the potential impact comprises determining separately the sensitivity of the organization to compromise of an essential attribute of the affected asset.

28. The method of claim 27, wherein the essential attribute comprises one or more of the group of essential attributes comprising the integrity, availability, and confidentiality of the affected asset.

29. The method of claim 24, wherein the sensitivity of the affected asset comprises an attribute of the affected asset.

30. The method of claim 24, wherein the criticality comprises an attribute of the affected asset.

31. A system for managing a network security incident comprising at least one underlying security event, the system comprising:
a connection configured to receive data associated with the event;
one or more processors configured to:
receive a first set of data associated with the event;
identify based at least in part on said first set of data an initial group including a first set of one or more recommended responsive actions to be taken in response to the event;
receive a second set of data associated with the event; and update said initial group of one or more recommended responsive actions to include a second set of one or more recommended responsive actions based at least in part on said second set of data associated with the event; and memory associated with at least one of said one or more processors and configured to store data associated with said event.

32. A computer program product for managing a network security incident comprising at least one underlying security event, the computer program product being embodied in a computer readable medium and comprising computer instructions for:

receiving a first set of data associated with the event;

identifying based at least in part on said first set of data an initial group including a first set of one or more recommended responsive actions to be taken in response to the event;

receiving a second set of data associated with the event; and updating said initial group of one or more recommended responsive actions to include a second set of one or more recommended responsive actions based at least in part on said second set of data associated with the event.

* * * * *